(12) United States Patent
Aydin et al.

(10) Patent No.: US 12,403,425 B2
(45) Date of Patent: Sep. 2, 2025

(54) EXHAUST GAS TREATMENT SYSTEM (71) Applicants: Johnson Matthey Public Limited Company, London (GB); GM Global Technology Operations LLC, Detroit, MI (US)

(72) Inventors: Ceren Aydin, Audubon, PA (US); Patrick Bannon, Wayne, PA (US); Penelope Markatou, Audubon, PA (US); Dennis Murray, Wayne, PA (US); Rahul Mital, Detroit, MI (US); Eric Darvin Thomas, Detroit, MI (US)

(73) Assignees: Johnson Matthey Public Limited Company, London (GB); GM Global Technology Operations LLC

( * ) Notice: Subject to any disclaimer, the term of this patent is extended or adjusted under 35 U.S.C. 154(b) by 0 days.

(21) Appl. No.: 18/239,850

(22) Filed: Aug. 30, 2023

(65) Prior Publication Data
US 2024/0066468 A1 Feb. 29, 2024

Related U.S. Application Data (60) Provisional application No. 63/374,056, filed on Aug. 31, 2022.

(51) Int. Cl.
*B01D 53/94* (2006.01)
*F01N 3/08* (2006.01)
(Continued)

(52) U.S. Cl.
CPC ..... *B01D 53/9418* (2013.01); *B01D 53/9495* (2013.01); *F01N 3/208* (2013.01);
(Continued)

(58) Field of Classification Search
CPC ........ F01N 3/021; F01N 3/035; F01N 3/0814; F01N 3/106; F01N 3/108; F01N 3/206;
(Continued)

(56) References Cited

U.S. PATENT DOCUMENTS 7,393,511 B2   7/2008  Tran et al.
8,524,185 B2   9/2013  Caudle et al.
(Continued)

FOREIGN PATENT DOCUMENTS

DE   102017011300 A1   5/2018
WO     2016092170 A1   6/2016

OTHER PUBLICATIONS

International Search Report and Written Opinion of the International Searching Authority dated Nov. 24, 2023 for PCT/EP2023/073778 (12 pages).
(Continued)

*Primary Examiner* — Binh Q Tran
(74) *Attorney, Agent, or Firm* — Merchant & Gould P.C.

(57) ABSTRACT

Methods and systems related to an exhaust gas treatment system including, in order:
(i) a first means for injecting a nitrogenous reductant;
(ii) a first selective catalytic reduction (SCR) catalyst;
(iii) an ammonia slip catalyst (ASC); and
(iv) a second selective catalytic reduction (SCR) catalyst, wherein the ASC comprises an SCR catalyst and a supported palladium (Pd) component.

14 Claims, 7 Drawing Sheets

(51) Int. Cl.
*F01N 3/10* (2006.01)
*F01N 3/20* (2006.01)

(52) U.S. Cl.
CPC ...... *B01D 53/9422* (2013.01); *B01D 53/9427* (2013.01); *B01D 2255/1023* (2013.01); *B01D 2255/50* (2013.01); *F01N 3/0814* (2013.01); *F01N 3/108* (2013.01); *F01N 3/206* (2013.01); *F01N 2900/1616* (2013.01)

(58) Field of Classification Search
CPC .... F01N 3/2066; F01N 3/208; F01N 2370/04; F01N 2560/026; F01N 2570/18; F01N 2610/02; F01N 2900/06; F01N 2900/1616; F01N 2900/1622; B01D 53/58; B01D 53/8634; B01D 53/9418; B01D 53/9422; B01D 53/9427; B01D 53/9495; B01D 53/9436; B01D 53/9477; B01D 2255/1023; B01D 2255/50; B01D 2255/9022; B01D 2257/406; B01D 2258/012; B01D 71/02231; B01J 23/44; B01J 29/743; B01J 37/0244; B01J 37/0246; B01J 2523/824; B01J 2531/824; Y02T 10/12

See application file for complete search history.

(56) References Cited

U.S. PATENT DOCUMENTS

| | | | |
|---|---|---|---|
| 2008/0008629 A1 | 1/2008 | Doring et al. | |
| 2009/0035194 A1 | 2/2009 | Robel et al. | |
| 2011/0162347 A1 | 7/2011 | Katare et al. | |
| 2015/0037233 A1* | 2/2015 | Fedeyko | F01N 3/10 422/171 |
| 2017/0298796 A1* | 10/2017 | Naseri | F01N 13/0093 |
| 2018/0080359 A1* | 3/2018 | Price | B01J 23/10 |
| 2018/0221819 A1* | 8/2018 | Nilsson | F01N 13/009 |
| 2018/0221855 A1 | 8/2018 | Reith et al. | |
| 2022/0136424 A1* | 5/2022 | Adelman | F01N 3/2892 60/605.1 |
| 2022/0152589 A1* | 5/2022 | Chiffey | F01N 3/0231 |
| 2022/0162971 A1 | 5/2022 | Montgomery | |
| 2023/0203976 A1* | 6/2023 | Mital | F01N 3/021 423/213.2 |

OTHER PUBLICATIONS

Disclosed Anonymously, "Engine Exhaust Aftertreatment Method for avoiding Conversion of SCR Ammonia Slip into NOx in a Downsteam Catalyst", Research Disclosure, www.researchdisclosure.com, 2013, (3 pages).

* cited by examiner

EXHAUST GAS TREATMENT SYSTEM

The present invention relates to an improved exhaust gas treatment system with improved NOx treatment and reduced ammonia slip. In particular, the invention relates to the use of a palladium-containing Ammonia slip catalyst (ASC) configured to allow more aggressive ammonia dosing for NOx removal, without the expected increased ammonia slip.

Combustion of hydrocarbon fuel produces engine exhaust or flue gas that contains, in large part, relatively benign nitrogen ($N_2$), water vapor ($H_2O$), and carbon dioxide ($CO_2$). But the exhaust gases also contain, in relatively small part, noxious and/or toxic substances, such as carbon monoxide (CO) from incomplete combustion, hydrocarbons (HC) from un-burnt fuel, nitrogen oxides (NOx) from excessive combustion temperatures, and particulate matter (mostly soot). To mitigate the environmental impact of exhaust gas released into the atmosphere, it is desirable to eliminate or reduce the amount of undesirable components, preferably by a process that, in turn, does not generate other noxious or toxic substances.

NOx, which includes nitric oxide (NO), nitrogen dioxide ($NO_2$), and nitrous oxide ($N_2O$), is a burdensome component to remove from exhaust gas generated by lean burn engines. The reduction of NOx to $N_2$ is particularly problematic in lean burn exhaust gas because the exhaust gas contains enough oxygen to favour oxidative reactions instead of reduction. Notwithstanding, NOx can be reduced by a process commonly known as Selective Catalytic Reduction (SCR). An SCR process involves the conversion of NOx, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is adsorbed onto the catalyst and the NO reduction reaction takes place as the gases pass through or over the catalysed substrate. The chemical equation for stoichiometric SCR reactions using ammonia is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

Some SCR processes utilize a stoichiometric excess of ammonia in order to maximize the conversion of NOx. Unreacted ammonia that passes through the SCR process (also referred to as "ammonia slip") is undesirable, because the slipped ammonia gas can react with other combustion species and/or negatively impact the atmosphere if released. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania, alumina, silica, zirconia, etc. These catalysts oxidize $NH_3$ to yield $N_2$ and/or secondary $NOx+H_2O$ as follows:

$$4NH_3+7O_2 \rightarrow 4NO_2+6H_2O$$

$$4NH_3+5O_2 \rightarrow 4NO+6H_2O$$

$$2NH_3+2O_2 \rightarrow N_2O+3H_2O$$

$$4NH_3+3O_2 \rightarrow 2N_2+6H_2O$$

To remedy this secondary NOx formation, typical ASCs comprise a top catalyst layer comprising a conventional SCR catalyst and a bottom catalyst layer comprising the ammonia oxidation catalyst. Exhaust gas containing slipped $NH_3$, and little or no NOx, passes through the top SCR layer of the ASC wherein the SCR catalyst stores a portion of the $NH_3$. Another portion of the $NH_3$ continues to permeate through the catalyst until it reaches the bottom layer where it is oxidized into secondary NOx and $H_2O$. The secondary NOx permeates back through the top layer where it reacts with the stored $NH_3$ to produce $N_2$ and $H_2O$.

The top and bottom layers of the ASC are segregated to prevent immediate oxidation of the $NH_3$ which would lead to formation of untreated secondary NOx in the exhaust stream. For this reason, the top layer in ASCs is generally free from noble metals, such as platinum group metals (PGMs). Moreover, the bottom layer containing the PGM-based oxidation catalyst is completely covered by the top layer to prevent untreated secondary NOx from entering the exhaust stream.

Configurations and compositions of ammonia slip catalysts are well known in the art. An ASC is generally placed at the end of an exhaust system as a gate-keeper against ammonia slip from the system, as discussed above.

It is conventional to use Pt in an ammonia slip catalyst (ASC). Pt has lower light-off temperature (~250° C.) than Pd (~400° C.). This means that it is preferred to use Pt over Pd in an ASC at the end of an exhaust system since the Pt is able to achieve lower levels of $NH_3$ slip at low temperatures than Pd. Pt is most useful to clean-up exhausts emissions on cold start in an ASC, before the SCR is up to temperature and using the ammonia to convert the NOx.

While Pt ASCs are the commercialised products, palladium-containing ASCs have also been contemplated. For example, US20150037233 discloses the provision of a palladium-containing ASC component.

It is an object of the invention to provide an improved exhaust gas treatment system, to tackle problems associated with the prior art and/or to at least provide a commercially viable alternative thereto.

Accordingly, the present invention provides an exhaust gas treatment system comprising, in order:
(i) a first means for injecting a nitrogenous reductant;
(ii) a first selective catalytic reduction (SCR) catalyst;
(iii) an ammonia slip catalyst (ASC); and
(iv) a second selective catalytic reduction (SCR) catalyst,
wherein the ASC comprises an SCR catalyst and a supported Palladium (Pd) component.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present inventors have now found that the disclosed exhaust system can now be operated in a different way from one relying on a conventional ASC. Rather than being a clean-up catalyst at the end of the system for occasional use—cold start and high temperature ammonia slip events—the ASC is being used continuously as a damper, controlling the ammonia feed to the second SCR. That is, the system does not have a further injector upstream of the second SCR, but the ASC acts as a damper, controlling the ammonia seen by the second SCR. This system is able to operate with lower NOx emissions and lower $NH_3$ slip, despite the more aggressive ANR targeted upstream of the first SCR.

In particular, the single injector upstream of the SCR/ASC/SCR configuration is run aggressively with an ammonia to NOx ratio (ANR) ratio >1 (more ammonia than stoichiometric). This means that the NOx reduction on the first SCR component can be very high. This however leads to increased $NH_3$ slip out of the first SCR component which needs to be mitigated. It is, in this case, mitigated by the Pd-containing ASC.

In order to run the ASC in this way it is necessary to use a Pd ASC (i.e., not a Pt ASC). The Pd ASC is highly selective for $N_2$ over NOx. This means that in an operating window above 400° C., above the $NH_3$ oxidation light-off temperature observed on the Pd ASC, the Pd ASC is able to cope with the intentional ammonia slip without undue NOx remake. If there was high NOx remake, then this would render the higher SCR NOx conversion moot. Since a Pt ASC is less selective to $N_2$ formation (i.e., generates higher amount of NOx re-make), at high temperatures when exposed to intentional $NH_3$ slip from an aggressive dosing strategy, there would be significant NOx remake, negating the high NOx reduction achieved over SCR, resulting in an increase in NOx emissions.

In the new continuous use approach Pd, with its better selectivity to $N_2$ formation, is ideal. Moreover, since the component is not right at the end of the system (c.f. conventional ASC) it is encountering conditions which are closer to an optimal operating condition for the Pd.

The present disclosure relates to an exhaust gas treatment system. An exhaust gas treatment system is a conventional arrangement of catalyst components provided within a gas-tight flow path. The system extends from the exhaust manifold of a source of exhaust gases to an outlet for releasing the treated exhaust gases to the atmosphere. Typically, the exhaust manifold is from an engine, such as a diesel automobile engine. The exhaust gases from a diesel engine comprise hydrocarbons (HC), carbon monoxide (CO) and nitrogen oxides (NOx). These gaseous components need to be treated to convert them before they are released to the atmosphere.

The exhaust gas treatment system disclosed herein relies on the provision of known exhaust gas system components provided in a new configuration. That is, while the Pd-containing ASC is unusual, it has not been disclosed in the SCR/ASC/SCR configuration disclosed herein. The further components, including, for examples, the DOC, SCR, CSF components can all take a range of different forms and configurations and are not unduly limited. These components all fall within the knowledge of the skilled person and can be selected and configured as necessary for the finally configured system.

The system comprises a number of components "in order". That is, the components are provided in fluid connection with each other, arranged so that exhaust gases passing through the exhaust gas treatment system contact each of the components in turn, in the order recited. For example, the exhaust gases to be treated must pass through the first SCR before passing through the ASC.

The system comprises a first means for injecting a nitrogenous reductant. Such means are typically a spray injector. The nitrogenous reductant is typically, urea or ammonia, although other precursor chemicals can be injected which decompose to provide ammonia in-situ. For simplicity, the present disclosure refers generally to ammonia, but this is short-hand for an ammonia-equivalent in those embodiments where the nitrogenous reductant is not ammonia per se. Preferably the nitrogenous reductant is ammonia.

Preferably the first means for injecting a nitrogenous reductant is configured to dose the nitrogenous reductant at an ANR of greater than 1, preferably from 1.1 to 1.5. An ANR, or ammonia to NOx ratio, is well known in the art. In conventional system it is generally the case that the ANR is configured to targets an ANR of 1. That is, a stoichiometric ratio of ammonia (or ammonia-equivalent) to $NO_x$ of 1. This configuration can be based on a measurement by a first sensor for determining a NOx level in the exhaust gases.

Preferably the system further comprises a first sensor for determining a NOx level in the exhaust gases. The first sensor may be a NOx measurement sensor arranged downstream of the first means for injecting a nitrogenous reductant. Preferably when the first sensor is a NOx sensor it is downstream of the first SCR catalyst. In this way it is possible to provide feedback, based on the NOx passing through the first SCR to determine the nitrogenous dosing required to achieve the desired ANR. Alternatively, the first sensor is one or more of a temperature sensor, an engine speed sensor and an engine load sensor. Based on such measurements it is possible to use a look-up table to determine the estimated NOx level in the exhaust gases.

The system comprises a first selective catalytic reduction (SCR) catalyst. SCR catalysts are well known in the art. The SCR catalyst of the present invention is not particularly limited, provided that it can selectively reduce NOx in the presence of a reductant in an oxidative environment. Preferably the first SCR catalyst comprises a Cu or Fe-doped zeolite component.

SCR catalyst preferably comprises at least one promoter metal on a high surface area support including refractory metal oxides and molecular sieves such as aluminosilicate (zeolites), silico-aluminophosphate (SAPOs), or aluminophosphate (AlPOs). In certain embodiments, the SCR catalyst has little to no $NH_3$ oxidative capacity but can store and release $NH_3$ as a function of temperature, as a function of a lean or rich environment, or both. As used herein, the term "lean environment" refers to an exhaust gas generated by combusting fuel in excess of the stoichiometric air-fuel mixture (e.g., excess air) or an exhaust gas containing an amount of oxygen at least equivalent to a lean burn exhaust gas. As used herein, the term "rich environment" means an exhaust gas generated by combustion of a rich mixture of air-fuel.

Preferred promoter metals are selected from the group consisting of V, Cr, Co, Cu, Fe, Hf, La, Ce, In, V, Mn, Ni, Zn, Ga, either individually or combinations thereof. The promoter metal can be a free metal or metal ion and can be incorporated on or within the support by various techniques including ion exchange, incipient wetness, direct coating, or in situ during the synthesis of the support material. Preferred promoter metals include Cu and Fe, particularly when the promoter metal is loaded on and/or within a molecular sieve, preferably a small pore zeolite.

The promoter metal oxide may be vanadium such as free vanadium, vanadium ion, or an oxide of vanadium or a derivative thereof. Preferably, the form of vanadium is vanadia ($V_2O_5$). In addition to vanadium, the promoter metal oxide can include other catalytically active metal oxides such as oxides of tungsten and/or oxides of molybdenum. As used herein, a "catalytically active" metal oxide is one that directly participates as a molecular component in the catalytic reduction of NOx and/or oxidization of $NH_3$ or other nitrogenous-based SCR reductants. In certain embodiments, the SCR catalyst is $V_2O_5/WO_3/TiO_2$, and optionally includes $MoO_3$.

Preferred molecular sieve supports include zeolites and SAPOs having a framework selected from the group consisting of AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER. In certain embodiments, the framework is selected from AEI, CHA, and intergrowths thereof. Preferred aluminosilicate molecular sieves have a silica-to-alumina ratio of about 10 to about 50, preferably about 15 to about 25.

Particularly preferred SCR catalyst include $V_2O_5/WO_3/TiO_2$, optionally including $MoO_3$; Cu loaded on an aluminosilicate molecular sieve having a framework selected from AEI, CHA, or a combination or intergrowth thereof; and Fe loaded on an aluminosilicate molecular sieve having a framework selected from BEA and FER.

The system comprises an ammonia slip catalyst (ASC). The ASC comprises an SCR catalyst and a supported Palladium (Pd) component. The SCR catalyst component may be any of the SCR catalysts discussed above.

By a supported Palladium component, it is meant that the Palladium is supported on a support material. Such materials are well known in the art. The type of support for the palladium is not particularly limited provided that it is a particle having a large surface area, is inert, and is suitable for use in an after-treatment system. Examples of support materials include refractory metal oxides such as alumina, silica, zirconia, titania, ceria, and physical mixtures or composites thereof, with alumina and also ceria being particularly preferred. In certain embodiments, the supports have wide pores (e.g., 100-350 Å) or both wide and narrow pores. In certain embodiments, the support has a BET surface area of at least 50 $m^2/g$, preferably about 50-500 $m^2/g$, more preferably about 50-300 $m^2/g$, or about 150-250 $m^2/g$. Refractory metal oxide supports preferably have a pore volume of about 0.1-0.5 g/cc, for example about 0.2-0.4 g/cc, preferably measured by mercury intrusion porosimetry.

Other palladium supports for the second oxidation catalyst include molecular sieves such as aluminosilicates, silicoaluminophosphates, and aluminophosphates having a zeolite-type framework, such as AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER. Preferably the Palladium component is supported on a particulate metal oxide or a zeolite, preferably alumina.

Preferably the ASC is substantially Pt-free. The presence of the less selective Pt in the exhaust system would lead to undesirable NOx production. Accordingly, its content should be minimised. Preferably the ASC contains less than 10 wt % Pt, preferably less than 2 wt %, preferably less than 1 wt %, based on the total weight of PGMs in the ASC, and preferably it is Pt-free.

Although it is known to provide ASC components comprising a mixture of Pt and an SCR catalyst, it is preferred that the ASC for the present system has a layered structure. That is, preferably the Pd is provided in a separate layer from the SCR catalyst. Preferably in this layered structure an upper layer comprises the SCR catalyst and a lower layer comprises the supported Palladium (Pd) component. The SCR catalyst incorporated into an ASC is used to treat secondary NOx and is physically separate and distinct from the SCR catalysts (first, second and third) discussed herein for treating NOx generated by combustion of fuel more generally.

The system comprises a second selective catalytic reduction (SCR) catalyst. The SCR catalyst component may be any of the SCR catalysts discussed above. Preferably the second SCR catalyst comprises a Cu or Fe-doped zeolite component.

Preferably there is not a further means for injecting a nitrogenous reductant after the first SCR. That is, the Pd-ASC provides all of the requisite ammonia control for the second SCR catalyst that is required in the system.

In one embodiment the first selective catalytic reduction (SCR) catalyst and the ammonia slip catalyst (ASC) share a common substrate. In another embodiment, the ammonia slip catalyst (ASC) and the second selective catalytic reduction (SCR) catalyst share a common substrate. Alternatively, all three may be provided on separate substrates. providing one or more of the components on a common substrate provides efficiencies of space and volume in the exhaust system.

When they share a common substrate, preferably the ASC is provided on less than 50%, more preferably from 10-40% of an axial length of the shared substrate, with the SCR catalyst (first or second) provided on the remainder of the length of the shared substrate.

The exhaust gas treatment preferably further comprises, upstream of the first means for injecting a nitrogenous reductant, in order: a second means for injecting a nitrogenous reductant; a third selective catalytic reduction (SCR) catalyst; and a catalysed soot filter (CSF). The third SCR catalyst may be any of the materials discussed above for SCR catalysts.

A catalysed soot filter is a known component in the art. In particular, it is a catalyst coated diesel particulate filter (DPF). It catalyses the oxidation of gaseous emissions, converting carbon monoxide and hydrocarbons in carbon dioxide and water, through the presence of precious metals (such as Pt and Pd) coated on a wall-flow monolith. It also oxidizes NO to $NO_2$ to provide sufficient $NO_2$ for passive regeneration of soot and sufficient $NO_2$/NOx ratio for SCR downstream. The wall-flow form means that it also filters out particulate matter which can be decomposed under hot conditions when the filter is regenerated.

When an exhaust system comprises a CSF, it is undesirable to have ammonia slipped onto it because the PGMs there will oxidise this to produce more NOx. Therefore, it is desirable to have the system comprising a CSF to operate with an under-dosing of ammonia on an upstream SCR (here, third SCR catalyst, which is the upstream or "front" SCR in this system). This means that the slip is a lot less likely, while still allowing a satisfactory amount of NOx reduction to take place on the SCR.

In use, the system has the front SCR (third SCR) which performs well under cold start conditions. However, given the temperature dependency of the SCR reaction, its performance declines under higher temperature conditions. The first and second SCRs are in a later, cooler position, so under conditions of high load in the engine (when it is all hot), these can take over the SCR performance required. The configuration of catalysts disclosed herein therefore permits a novel ammonia management approach whereby you reduce the ammonia more at the upstream injector, and increase it at the downstream injector, in order to utilise the ammonia most effectively. Thus, an aspect of the invention here is to have controlled and varying dosing between the two injectors, based on temperature conditions throughout the exhaust system (at the front when cold, and then towards the back when warmer).

Preferably the exhaust system further comprises a diesel oxidation catalyst upstream of the second means for injecting a nitrogenous reductant or between the third SCR catalyst and the CSF. Diesel oxidation catalysts are well known in the art. Diesel Oxidation Catalysts (DOC) are catalytic converters designed specifically for diesel engines and equipment to reduce Carbon Monoxide (CO), Hydrocarbons (HC) and Particulate Matter (PM) emissions. They also oxidize NO to $NO_2$ to provide sufficient $NO_2$/NOx ratio for SCR downstream. Modern catalytic converters typically comprise a monolith honeycomb substrate (flow-through substrate) coated with platinum group metal catalyst. The honeycomb structure with many small parallel channels presents a high catalytic contact area to exhaust gasses. As the hot gases contact the catalyst, several exhaust pollutants are converted into harmless substances: carbon dioxide and water.

Preferably the exhaust gas treatment system further comprises a second sensor for determining a NOx level in the exhaust gases and wherein the second means for injecting a nitrogenous reductant is configured, based on a measurement by the second sensor, to dose the nitrogenous reductant at an ANR of less than 1, preferably from 0.5 to 0.9. As with the first sensor, the second sensor may be a NOx measurement sensor arranged downstream of the second means for injecting a nitrogenous reductant, preferably downstream of the third SCR catalyst. Alternatively, the second sensor is one or more of a temperature sensor, an engine speed sensor and an engine load sensor. In this second alternative the use of these other sensors may be used alone, or in combination, with a look up table to estimate the NOx levels and to therefore arrive at the dosing for the desired ANR.

In one preferred embodiment, the system further comprises in order a CSF, or a DOC and CSF, downstream of the second SCR.

In one preferred embodiment, the system does not comprise any catalytic components downstream of the second SCR.

There will now be described several preferred embodiments of an exhaust system according to the invention. In the following embodiments only, the numerical labelling of the components will be revised to provide a more logical ascending numbering from the front of the exhaust system to the back. Therefore, in the following, where there are two means for injecting a nitrogenous reductant, the labels for the "first" and "second" have been reversed. Similarly, in the following, where there are three SCR catalysts, the first, second and third SCR catalysts correspond to the third, first and second SCR catalysts discussed above, respectively. In all of these embodiments the ASC is as described herein (i.e., Pd-based).

Figure 3:
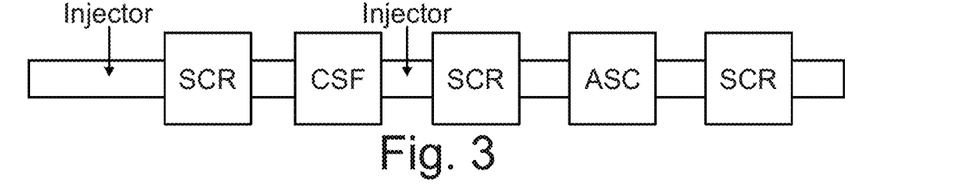
FIG. 3 shows a preferred embodiment of the exhaust system described herein.

According to a preferred embodiment, depicted in FIG. 3, the exhaust system comprises, in order:
(i) a first means for injecting a nitrogenous reductant;
(ii) a first selective catalytic reduction (SCR) catalyst;
(iii) a catalysed soot filter (CSF);
(iv) a second means for injecting a nitrogenous reductant;
(v) a second selective catalytic reduction (SCR) catalyst;
(vi) an ammonia slip catalyst (ASC); and
(vii) a third selective catalytic reduction (SCR) catalyst.

Figure 4:
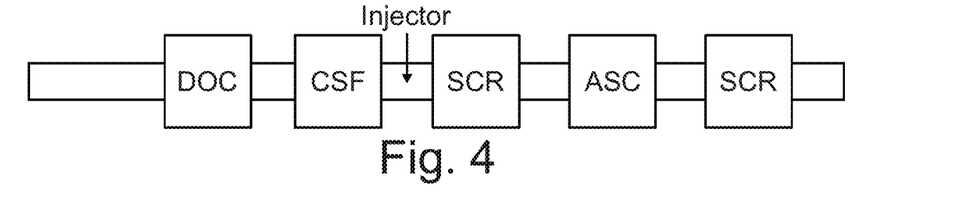
FIG. 4 shows a preferred embodiment of the exhaust system described herein.

According to a preferred embodiment, depicted in FIG. 4, the exhaust system comprises, in order:
(i) a diesel oxidation catalyst;
(ii) a catalysed soot filter (CSF).
(iii) first means for injecting a nitrogenous reductant;
(ii) a first selective catalytic reduction (SCR) catalyst;
(vi) an ammonia slip catalyst (ASC); and
(vii) a second selective catalytic reduction (SCR) catalyst.

Figure 5:
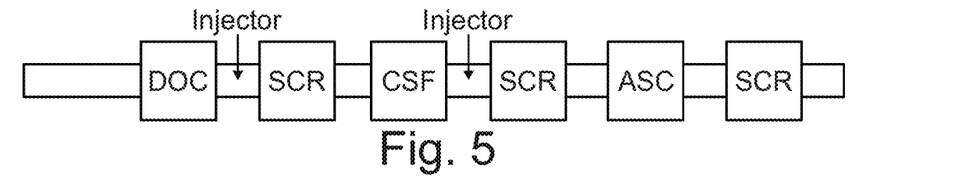
FIG. 5 shows a preferred embodiment of the exhaust system described herein.

According to a preferred embodiment, depicted in FIG. 5, the exhaust system comprises, in order:
(i) a diesel oxidation catalyst;
(ii) a first means for injecting a nitrogenous reductant;
(iii) a first selective catalytic reduction (SCR) catalyst;
(iv) a catalysed soot filter (CSF);
(v) a second means for injecting a nitrogenous reductant;
(vi) a second selective catalytic reduction (SCR) catalyst;
(vii) an ammonia slip catalyst (ASC); and
(viii) a third selective catalytic reduction (SCR) catalyst.

Figure 6:
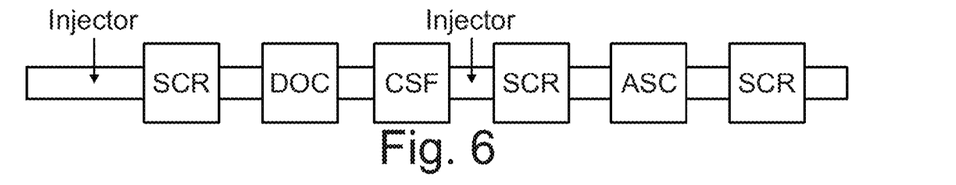
FIG. 6 shows a preferred embodiment of the exhaust system described herein.

According to a preferred embodiment, depicted in FIG. 6, the exhaust system comprises, in order:
(i) a first means for injecting a nitrogenous reductant;
(ii) a first selective catalytic reduction (SCR) catalyst;
(iii) a diesel oxidation catalyst;
(iv) a catalysed soot filter (CSF);
(v) a second means for injecting a nitrogenous reductant;
(vi) a second selective catalytic reduction (SCR) catalyst;
(vii) an ammonia slip catalyst (ASC); and
(viii) a third selective catalytic reduction (SCR) catalyst.

Figure 7:
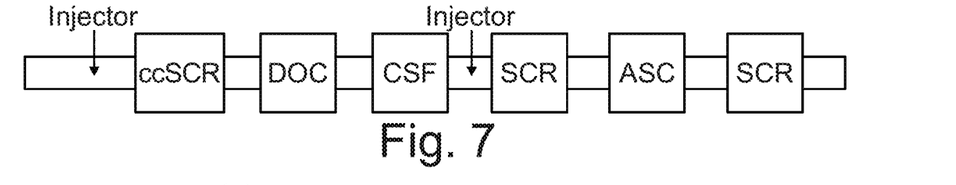
FIG. 7 shows a preferred embodiment of the exhaust system described herein.

According to a preferred embodiment, depicted in FIG. 7, the exhaust system comprises, in order:
(i) a first means for injecting a nitrogenous reductant;
(ii) a close-coupled (i.e. within 100 cm and preferably within 50 cm of the engine manifold) first selective catalytic reduction (SCR) catalyst;
(iii) a diesel oxidation catalyst;
(iv) a catalysed soot filter (CSF);
(v) a second means for injecting a nitrogenous reductant;
(vi) a second selective catalytic reduction (SCR) catalyst;
(vii) an ammonia slip catalyst (ASC); and
(viii) a third selective catalytic reduction (SCR) catalyst.

Figure 8:
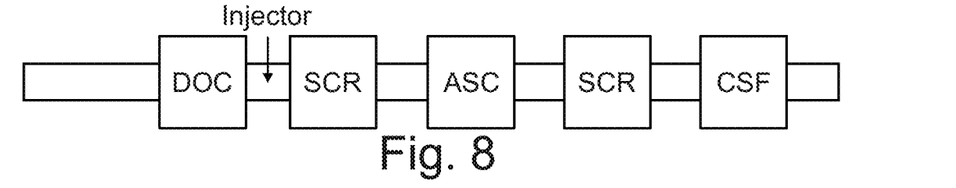
FIG. 8 shows a preferred embodiment of the exhaust system described herein.

According to a preferred embodiment, depicted in FIG. 8, the exhaust system comprises, in order:
(i) a diesel oxidation catalyst;
(ii) a first means for injecting a nitrogenous reductant;
(iii) a first selective catalytic reduction (SCR) catalyst;
(iv) an ammonia slip catalyst (ASC); and
(v) a second selective catalytic reduction (SCR) catalyst.
(vi) a catalysed soot filter (CSF).

Figure 9:
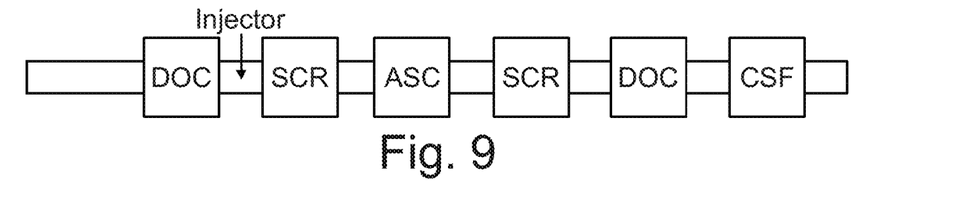
FIG. 9 shows a preferred embodiment of the exhaust system described herein.

According to a preferred embodiment, depicted in FIG. 9, the exhaust system comprises, in order:
(i) a first diesel oxidation catalyst;
(ii) a first means for injecting a nitrogenous reductant;
(iii) a first selective catalytic reduction (SCR) catalyst;
(iv) an ammonia slip catalyst (ASC); and
(v) a second selective catalytic reduction (SCR) catalyst.
(vi) a second diesel oxidation catalyst;
(vii) a catalysed soot filter (CSF).

Each of the foregoing examples may further comprise, downstream of the final selective catalytic reduction (SCR) catalyst, a (further) catalysed soot filter (CSF), or a further DOC and a (further) CSF.

According to a further aspect there is provided a diesel combustion and exhaust gas treatment system, the system comprising a diesel engine and the exhaust gas treatment system described herein arranged to treat an exhaust gas produced by the diesel engine.

According to a further aspect, there is provided a method for the treatment of an exhaust gas from a diesel engine, the method comprising passing the exhaust gas through the exhaust gas treatment system described herein.

Definitions

As used herein, the singular form of "a", "an" and "the" include plural references unless the context clearly dictates otherwise.

The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

As used herein, the term "on" is intended to mean "directly on" such that there are no intervening layers between one material being said to be "on" another material. Spatially relative terms, such as "below", "beneath", "lower", "above", "upper" and the like, may be used herein for ease of description to describe one element or feature's relationship to another element(s) or feature(s). It will be understood that the spatially relative terms are intended to encompass different orientations of the catalyst in use or operation in addition to the orientation depicted in the figures.

FIGURES

The present invention will now be described further with reference to the following non limiting Figures, in which:

FIGS. 12 and 13 compare performance of a conventional SCR/SCR/ASC arrangement, compared to the SCR/ASC/SCR configuration described herein.

Figure 1:
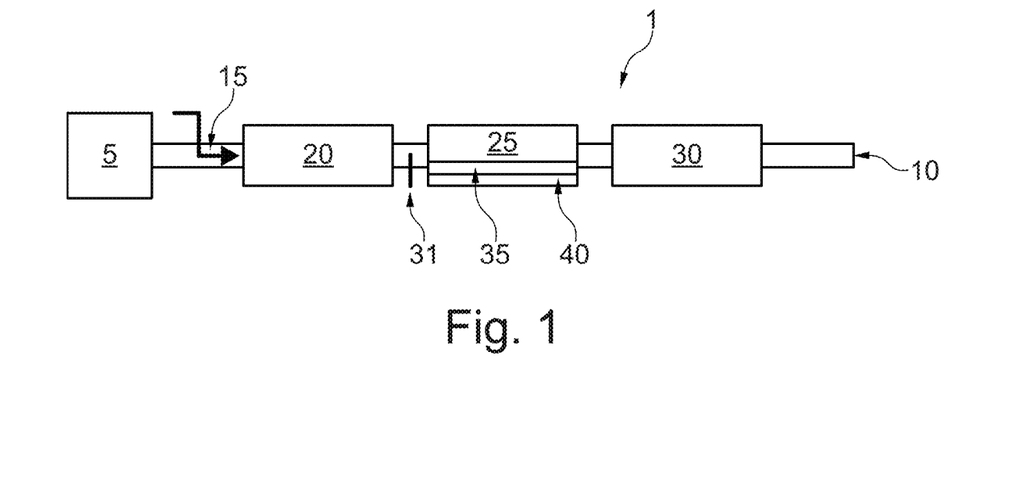
FIG. 1 shows the fundamental components of the exhaust system described herein.

As shown in FIG. 1, there is provided and exhaust gas treatment system 1 comprising, in order from the engine 5 to the emissions outlet 10: a first means for injecting a nitrogenous reductant 15, a first selective catalytic reduction (SCR) catalyst 20, an ammonia slip catalyst (ASC) 25; and a second selective catalytic reduction (SCR) catalyst 30. The system further comprises a NOx sensor 31.

The ASC 25 comprises an SCR catalyst layer 35 overlying a supported Palladium (Pd) containing layer 40.

In use, the first means for injecting a nitrogenous reductant 15 is run aggressively with an ANR ratio above 1. This permits thorough SCR reactions to take place on the first selective catalytic reduction (SCR) catalyst 20. The dosing of the nitrogenous reductant by the first means for injecting a nitrogenous reductant 15 is controlled based on measurements taken by the NOx sensor 31.

The ammonia slip catalyst (ASC) 25 serves to moderate the ammonia that passes to the second selective catalytic reduction (SCR) catalyst 30. This ensures that there is no ammonia slip and minimal NOx release. The position of the ammonia slip catalyst (ASC) 25 in the exhaust gas treatment system 1 means that it is running under optimal conditions for the Palladium component, such that it is highly selective for the NOx.

Figure 2:
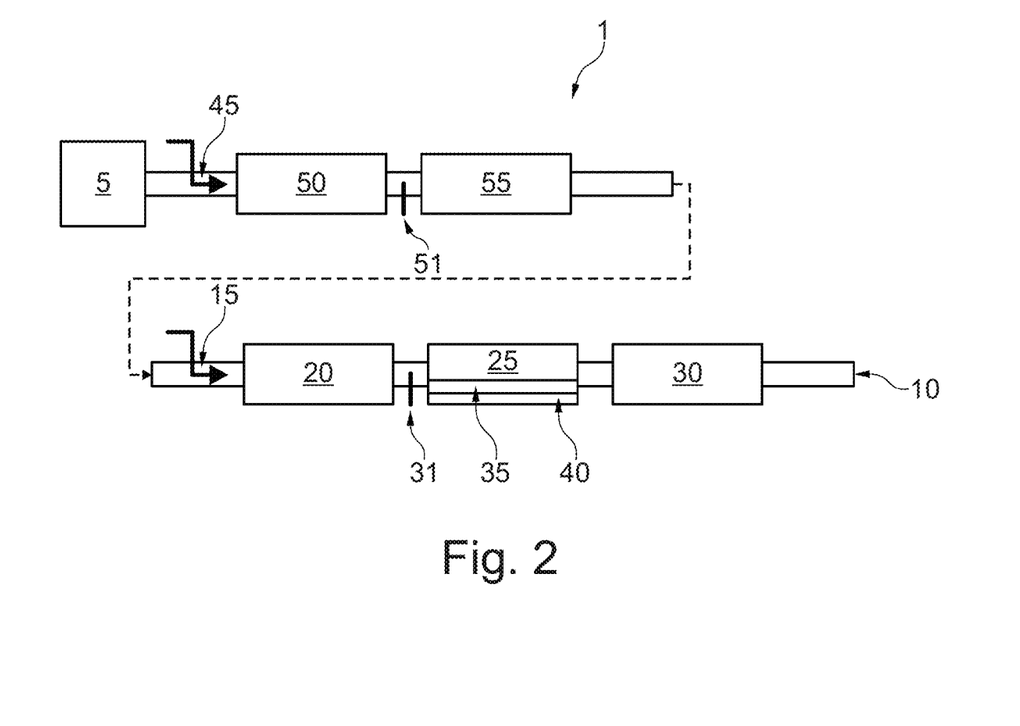
FIG. 2 shows a preferred embodiment of the exhaust system described herein.

As shown in FIG. 2, the exhaust gas treatment system 1 of FIG. 1 has now been provided with an upstream second means for injecting a nitrogenous reductant 45, a third selective catalytic reduction (SCR) catalyst 50 and a catalysed soot filter (CSF) 55. The system further comprises a further NOx sensor 51.

In use the second means for injecting a nitrogenous reductant 45 is run with an ANR of less than 1. This ensures that there is no (or minimal) ammonia slip onto the CSF 55. Any ammonia passing through the system is handled by the downstream SCR catalyst 20. The ANR of the second means for injecting a nitrogenous reductant 45 may be controlled based on measurements taken by the further NOx sensor 51.

On a cold start the third selective catalytic reduction (SCR) catalyst 50 handles the bulk of the SCR reactions required. However, as the exhaust gas temperature increases, the performance of the overly hot upstream third selective catalytic reduction (SCR) catalyst 50 will decline. It is therefore possible to save on ammonia by shifting the balance of the ammonia dosing from the second means for injecting nitrogenous reductant 45 which is upstream and hot, to the first means for injecting nitrogenous reductant 15 which is cooler and downstream. This means that the performance of the system can be enhanced with reduced usage of the nitrogenous reductant.

FIGS. 3-9 show the same components as the above FIGS. 1 and 2 with the same reference numerals. Additional components are indicated with their usual acronyms as discussed herein.

EXAMPLES

The present invention will now be described further in relation to the following non-limiting examples.

Exhaust gas systems were prepared and tested as discussed below.

Reactor Testing

The testing reactor was run on the following settings:

High Temperature (HT) aging: 650° C./264 h/10% $H_2O$/Air $SV_{acrossASC}$: 210,000 $h^{-1}$ Feedgas: 350 ppm NO, 500 ppm $NH_3$, 10% $O_2$, 6.5% $H_2O$, 7% $CO_2$, $N_2$ balance ASCs tested: 2 g/ft³ Pt or Pd, or 5 g/ft³ Pd, PGM·$Al_2O_3$-based bottom layer (0.35 g/in³ WCL excl. PGM), Cu·CHA-based top layer (3.33 wt % Cu, 2.4 g/in³ WCL)

SCR tested: Cu·CHA-based (3.33 wt % Cu, 2.4 g/in³ WCL)

Figure 10A:
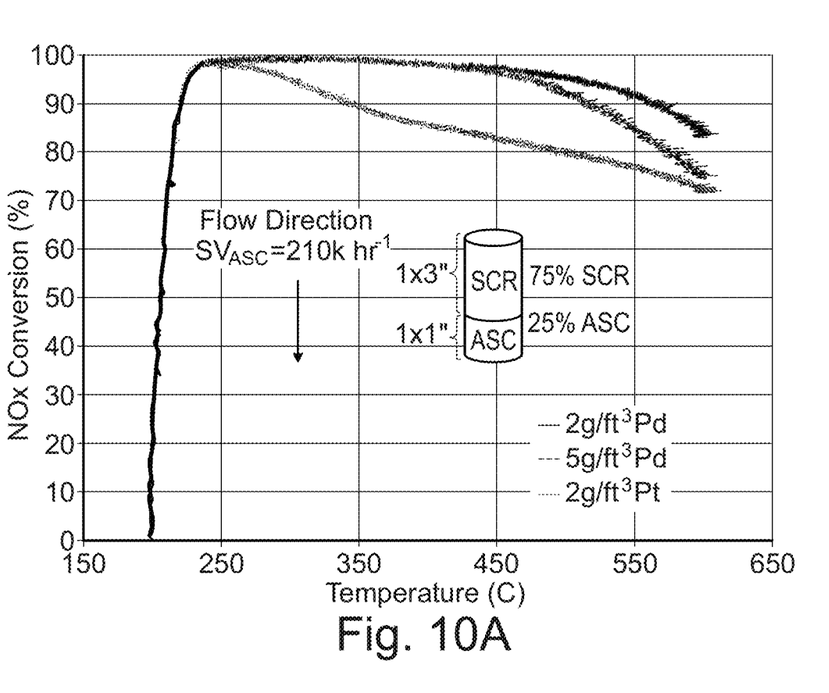
FIGS. 10A and 10B show comparative NOx conversion and $N_2O$ make for Pd and Pt ASC components in a conventional SCR/ASC configuration.
Figure 10B:
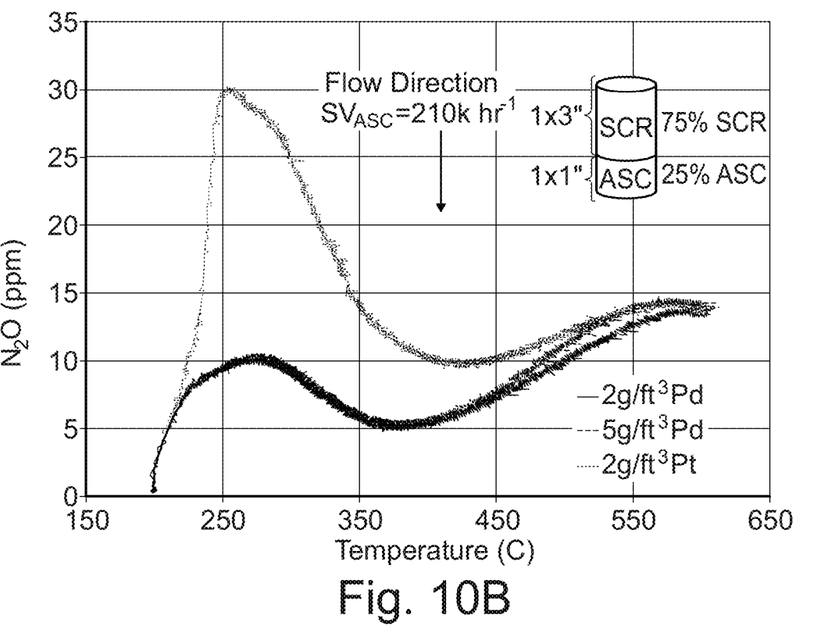

Temperature: 500° C./30 min preconditioning in base gases, followed by ramp to 200° C., start NO/NH₃ flow and measure emissions during ramp to 600° C. at 5° C./min FIGS. 10A and 10B show results for NOx conversion and N₂O make for comparison of Pt and Pd ASC components. The parts had been subjected to high temperature aging at 650° C. for 264 hours in 10% H₂O/Air. These are tested in a feedgas comprising 350 ppm NO, 500 ppm NH₃, 10% O₂, 6.5% H₂O, 7% CO₂, N₂ balance, using the reactor rig as described above.

FIG. 10A shows improved NOx conversion at high temperature for the two Pd-containing ASCs. The chart labels correspond in order (top to bottom) to the three lines at 550° C. FIG. 10B shows reduced N₂O make for the Pd-containing ASCs. At 550° C., the lowest line is the Pd (2 g/ft³) ASC. The highest line at 250° C. is the Pt ASC.

Figure 11A:
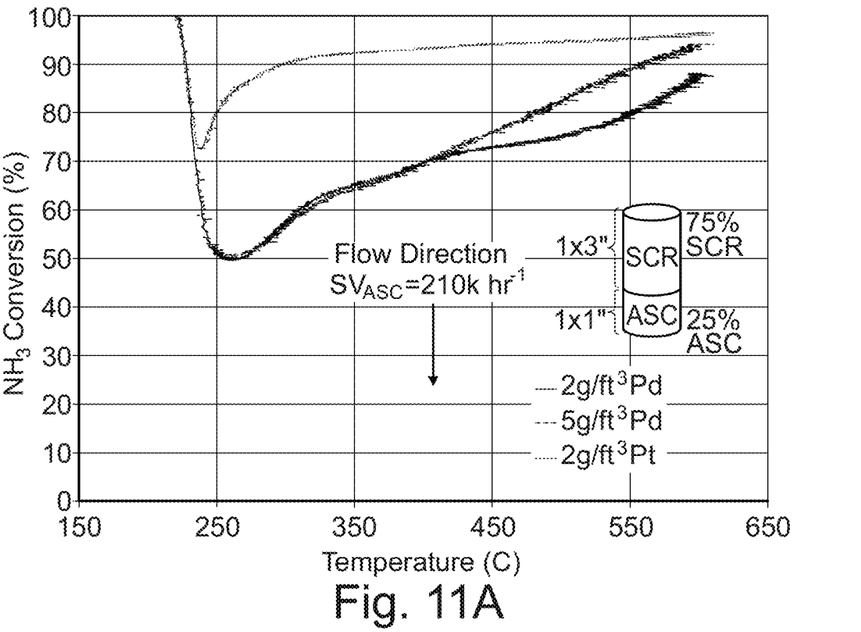
FIGS. 11A and 11B show comparative $NH_3$ conversion and slip for Pt and Pd-containing parts in a conventional SCR/ASC configuration.
Figure 11B:
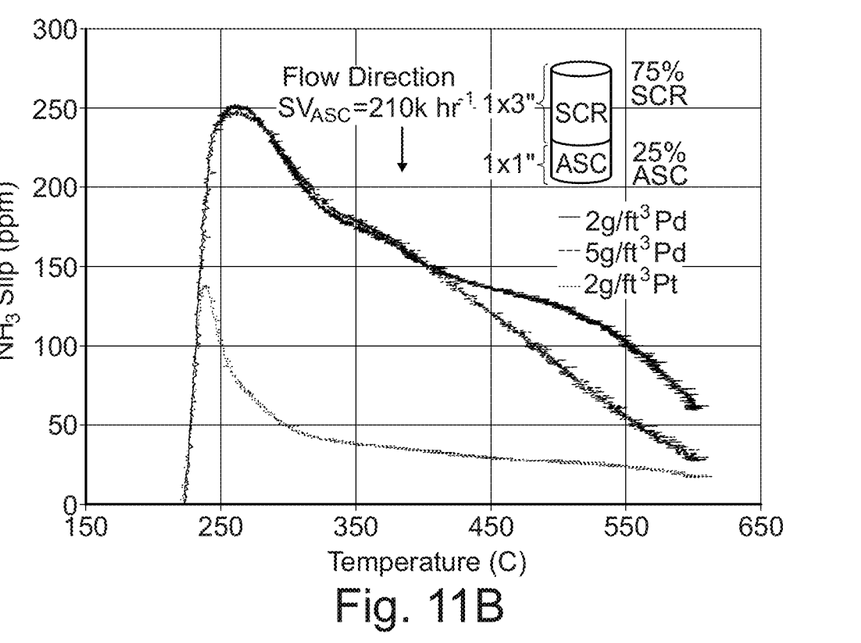

FIGS. 11A and 11B show results for NH₃ conversion and NH₃ slip for comparison of Pt and Pd ASC components. As can be seen, the Pd ASC shows slower NH₃ light-off but approaches similar conversion with a Pt ASC at a high temperature regime. In FIG. 11A the order of the lines at 550 C is the opposite to the order in which they are listed on the figure. In FIG. 11B the order of the lines at 550° C. matches the order in which they are listed in FIG. 8A.

Figure 12A:
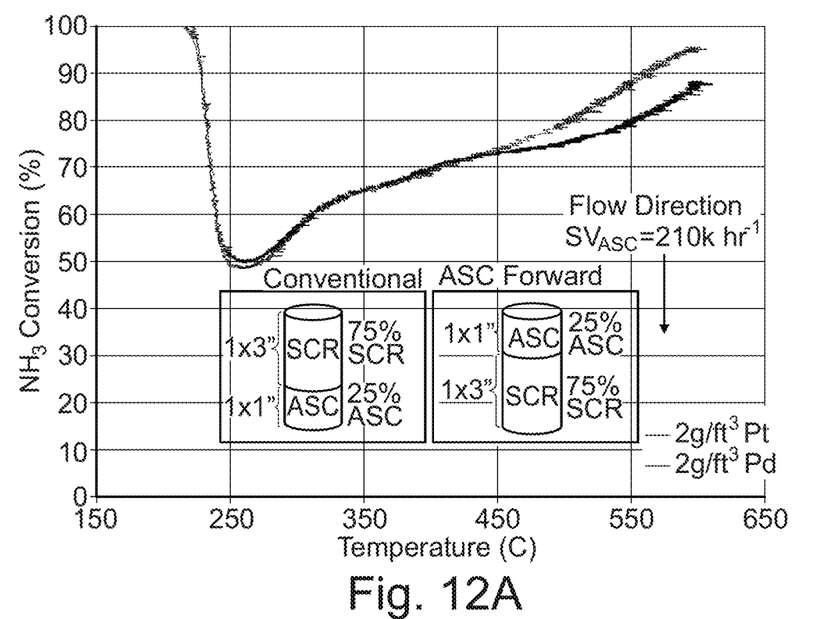
FIGS. 12A and 12B look at $NH_3$ conversion and slip, respectively.
Figure 12B:
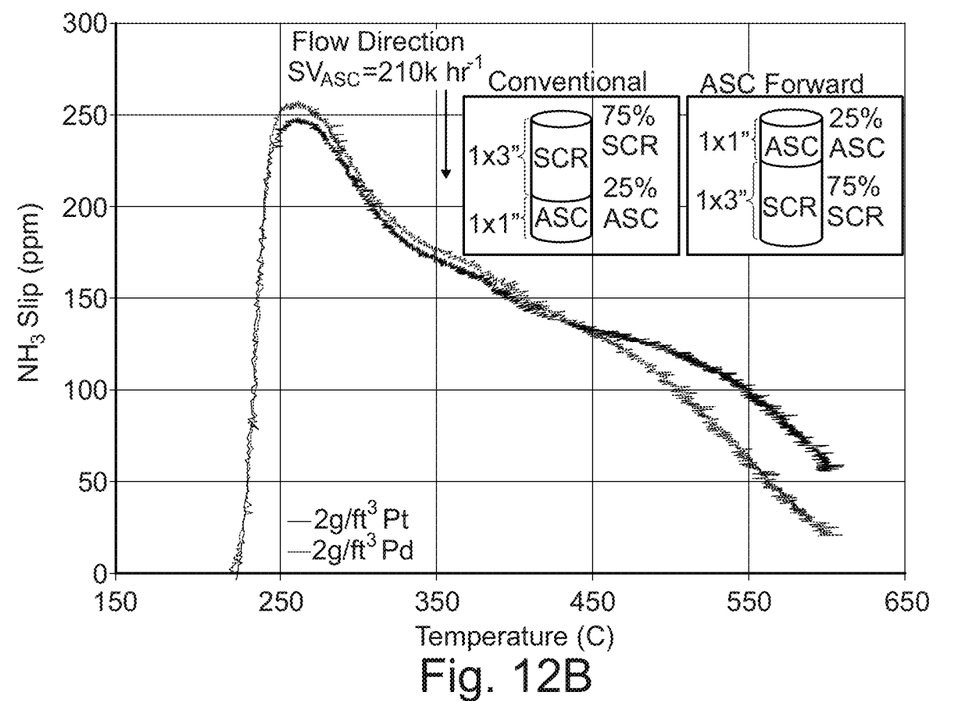

FIG. 12A show improved NH₃ conversion at higher temperatures for the SCR/ASC/SCR configuration disclosed herein. FIG. 12B show reduced NH₃ slip at higher temperatures for the SCR/ASC/SCR configuration disclosed herein.

Figure 13A:
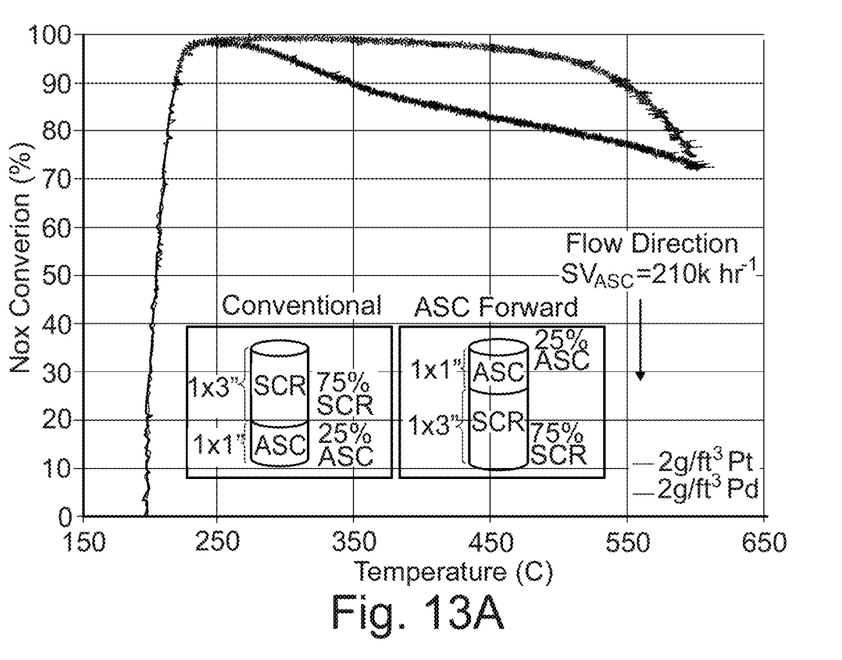
FIGS. 13A and 13B look at NOx conversion and $N_2O$ make, respectively.
Figure 13B:
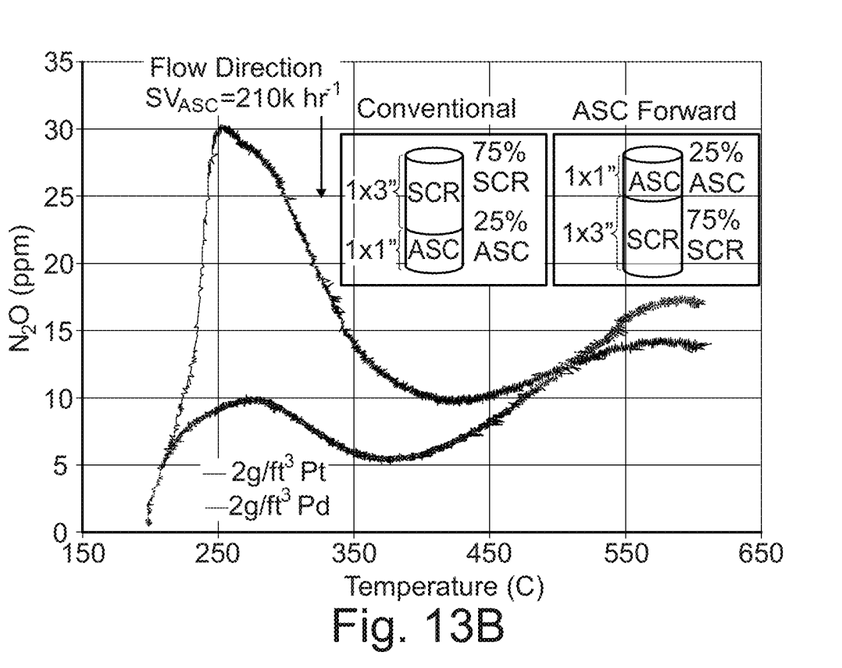

FIG. 13A show improved NOx conversion at higher temperatures for the SCR/ASC/SCR configuration disclosed herein. FIG. 13B show reduced N₂O production at temperatures below about 500 C for the SCR/ASC/SCR configuration disclosed herein (and comparable performance above).

As shown in FIGS. 10-13, Pd ASC shows higher NOx conversion at high temperature regime than Pt ASC, with NH₃ conversion approaching that of Pt ASC. Significantly lower N₂O make is observed on Pd ASC compared to Pt ASC at low temperature regime. The disclosed ASC configuration with Pd ASC shows higher NOx conversion and slightly higher N₂O make at high temperature regime compared to conventional configuration with Pt ASC.

Figure 14A:
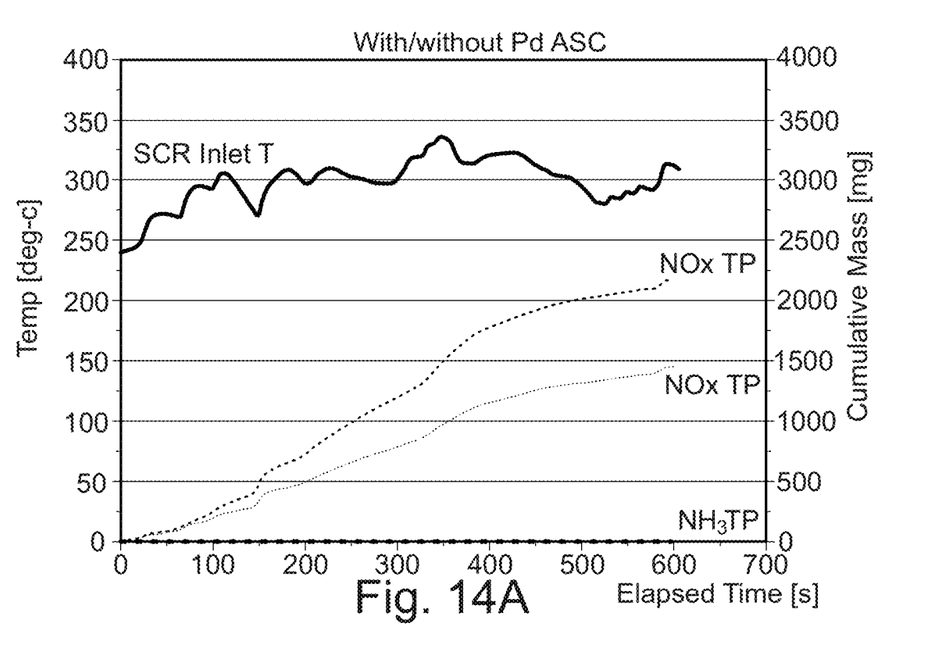
FIGS. 14A and 14B show the data obtained when testing the exhaust configuration on an engine.
Figure 14B:
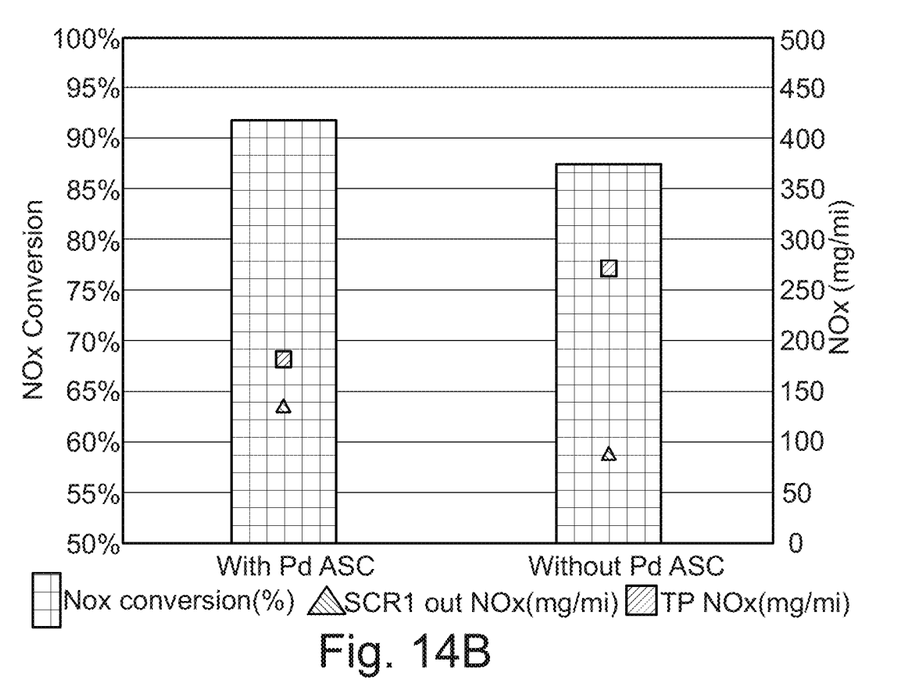

FIGS. 14A and 14B shows engine performance data for the exhaust system configured as described herein. As shown the NOx conversion is increased with a lower NOx output, despite the upstream SCR permitting greater NOx output due to slight variability in ammonia dosing. FIG. 14A shows NH₃ slip is mitigated (i.e., essentially zero).

Engine Testing Example

DOC+inj (ANR 0.9)+SCR1+CSF+inj (ANR 1.2)+SCR2 (with and without Pd ASC)+SCR3

DOC (Ba promoter, PGM·SiO₂/Al₂O₃-based, 2.6 g/in³ WCL)

SCR (4.25 wt % Cu, Cu·CHA-based, 2.4 g/in³ WCL, without ASC)

CSF (PGM·Al₂O₃-based, 0.2 g/in³ WCL)

SCR2 (3.33 wt % Cu, Cu·CHA-based, 2.4 g/in³ WCL), with or without 5 L Pd ASC (0:1/2)

SCR3 same as SCR2 (without ASC)

The above configuration was tested and demonstrated a reduced NOx output (mg/mi) during a US06 cycle ran on a 6.6 L light duty diesel engine, together with an increased NOx conversion.

The foregoing detailed description has been provided by way of explanation and illustration and is not intended to limit the scope of the appended claims. Many variations of the presently preferred embodiments illustrated herein will be apparent to one of ordinary skill in the art and remain within the scope of the appended claims and their equivalents.

The invention claimed is:

1. An exhaust gas treatment system comprising, in order:
   (i) a first means for injecting a nitrogenous reductant;
   (ii) a first selective catalytic reduction (SCR) catalyst;
   (iii) an ammonia slip catalyst (ASC); and
   (iv) a second selective catalytic reduction (SCR) catalyst,
   wherein the ASC comprises an SCR catalyst and a supported Palladium (Pd) component, and
   wherein the exhaust gas treatment system does not include a means for injecting a nitrogenous reductant downstream of the first selective catalytic reduction catalyst (SCR).

2. The exhaust gas treatment system according to claim 1, wherein the ASC has a layered structure, wherein an upper layer comprises the SCR catalyst and a lower layer comprises the supported Palladium (Pd) component.

3. The exhaust gas treatment system according to claim 1, wherein the system further comprises a first sensor for determining a NOx level in the exhaust gases,
   wherein the first means for injecting a nitrogenous reductant is configured, based on a measurement by the first sensor, to dose the nitrogenous reductant at an ANR of greater than 1, preferably from 1.1 to 1.5.

4. The exhaust gas treatment system according to claim 3, wherein the first sensor is a NOx measurement sensor arranged downstream of the first means for injecting a nitrogenous reductant, preferably downstream of the first SCR catalyst, or wherein the first sensor is one or more of a temperature sensor, an engine speed sensor and an engine load sensor.

5. The exhaust gas treatment system according to claim 1, further comprising upstream of the first means for injecting a nitrogenous reductant, in order:
   a second means for injecting a nitrogenous reductant;
   a third selective catalytic reduction (SCR) catalyst;
   a catalysed soot filter (CSF).

6. The exhaust gas treatment system according to claim 5, further comprising a diesel oxidation catalyst upstream of the second means for injecting a nitrogenous reductant or between the third SCR catalyst and the CSF.

7. The exhaust gas treatment system according to claim 5, wherein the exhaust gas treatment system further comprises a second sensor for determining a NOx level in the exhaust gases and wherein the second means for injecting a nitrogenous reductant is configured, based on a measurement by the second sensor, to dose the nitrogenous reductant at an ANR of less than 1, preferably from 0.5 to 0.9.

8. The exhaust gas treatment system according to claim 1, wherein the first selective catalytic reduction (SCR) catalyst and the ammonia slip catalyst (ASC) share a common substrate, or wherein the ammonia slip catalyst (ASC) and the second selective catalytic reduction (SCR) catalyst share a common substrate.

9. The exhaust gas treatment system according to claim 1, wherein the first and/or second SCR catalyst comprises a Cu or Fe-doped zeolite component.

10. The exhaust gas treatment system according to claim 1, wherein the ASC is substantially Pt-free.

11. The exhaust gas treatment system according to claim 1, wherein the Palladium component is supported on a particulate metal oxide or a zeolite, preferably alumina.

12. The exhaust gas treatment system according to claim 1, wherein the system further comprises in order a CSF, or a DOC and CSF, downstream of the second SCR, or wherein the system does not comprise any catalytic components downstream of the second SCR.

13. A diesel combustion and exhaust gas treatment system, the system comprising a diesel engine and the exhaust gas treatment system according to claim 1 arranged to treat an exhaust gas produced by the diesel engine.

14. A method for the treatment of an exhaust gas from a diesel engine, the method comprising passing the exhaust gas through the exhaust gas treatment system according to claim 1.

* * * * *